June 3, 1947.  A. MARINO  2,421,458

CLIP LOCK INCLINED BABY BOTTLE HOLDER

Filed March 19, 1946

INVENTOR.
Anthony Marino
BY Louis Schumacher, Atty.

Patented June 3, 1947

2,421,458

UNITED STATES PATENT OFFICE 2,421,458

CLIP LOCK INCLINED BABY BOTTLE HOLDER

Anthony Marino, New York, N. Y.

Application March 19, 1946, Serial No. 655,488

5 Claims. (Cl. 248—105)

This invention relates to devices, such as holders for baby milk bottles.

One object of the invention is to provide a device of the character described having improvements for holding a milk bottle downwardly inclined so that a baby that is in a lying down position can drink all the liquid in the bottle, without requiring that the mother hold the bottle in inclined position.

Another object of the invention is to furnish an improved inclined baby bottle holder adapted to clip the bottle for securely holding it in position.

Another object of the invention is to provide such a device having improved means adapted for clip-like engagement in inclined position of baby milk bottles of different lengths.

Another object of the invention is the provision of a device of the nature referred to adapted to rest directly upon the person using it without requiring any other attachment or mounting means.

A further object of the invention is to provide a device of the type mentioned which is very simple in construction, cheap to manufacture, easy to clean, neat and compact, and durable, reliable, and highly efficient in use.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Figure 1:
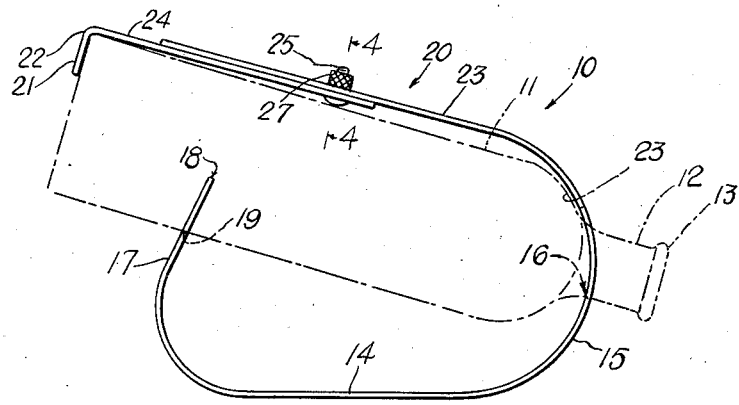
Figure 1 is a view in side elevation showing a device embodying the invention, with the bottle indicated in dot-dash lines.
Figure 2:
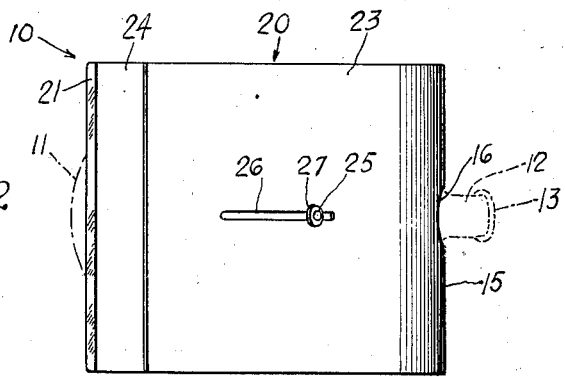
Fig. 2 is a top plan view thereof on a reduced scale.
Figure 3:
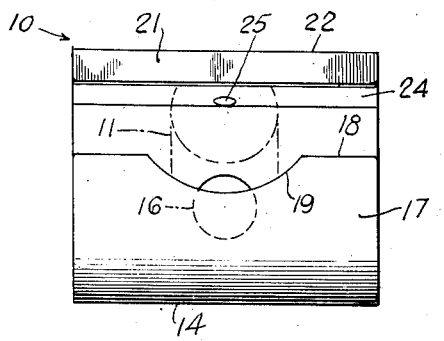
Fig. 3 is a view in end elevation.
Figure 4:
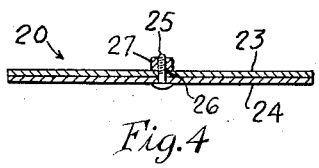
Fig. 4 is a sectional view on a reduced scale taken on line 4—4 of Fig. 1.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing therefore, is submitted merely as showing a preferred exemplification of the invention.

Referring in detail to the drawing, 10 denotes a device embodying the invention in operative position for holding the baby milk bottle 11. As thus positioned, all or substantially all of the contents of the bottle are adapted to drain downward through the neck of the bottle 12 and a nipple which may be attached to the lip 13 so that the baby lying on its back shall be able to drink all of the liquid without assistance.

The device 10 comprises a base portion 14 of any suitable shape, preferably plane, and having substantial width and area so as to afford a good and substantial seating directly on the body of the baby or on any sheets which may cover the same.

As shown in the drawing, this base is horizontal, but it is to be understood that it may be at an angle according to the surface on which it happens to be supported. Extending upward from the base 14 is a front wall 15 which may be curved for neatness and smoothness. This wall 15 is provided with opening 16 which may be circular in form and sufficiently large in diameter to readily pass lip 13 and to freely receive the neck 12 of the bottle. At the rear end of the base, there extends upwardly therefrom a supporting wall 17 which is at least partially curved for the same reasons as in the case of the wall 15. The rear wall 17 is formed at its top edge 18 with an opening or notch 19 to receive a portion of the bottle 11. Since the bottles used may vary in diameter, the curvature of the recess 19 may be substantially less than that of the bottle. When the bottle rests in the opening 19 and is thus supported by the wall 17, it is in downwardly inclined position because the opening 16 is relatively lower than the recess 19. This will apply regardless of the size of the bottle, and it is to be understood that the opening 16 may also be of sufficient size to receive a neck 12 of varying diameter.

Because many babies are restless, and in moving around may tend to dislodge the bottle from the support, the device 10 includes a top wall 20 which is connected to the front wall 15 and extends upwardly and rearwardly therefrom approximately according to the angle of the bottle. This wall 20 may be in resilient relation to the wall 17 to tend to press the bottle downward into the recess 19 whereby the bottle is securely held against slipping out of the holder.

Furthermore, this resilient character of the device permits it to receive bottles of different diameters. Preferably, the wall 20 extends rearward beyond the base 14 and terminates in a downwardly extending flange 21 bent therefrom at 22. This flange engages the bottom wall of the bottle for which it forms a seat so that by no possibility can the bottle slip longitudinally with the neck and nipple becoming free of the holder, whereby the neck of the bottle or its nipple would eventually drop into the holder itself and become inaccessible to the baby. The parts may be so proportioned that when the shoulder 23 of the bottle contacts the front wall 15, the flange 21 securely engages the base of the bottle. The device 10 may be expanded and spring open sufficiently to permit the bottle to pass underneath the flange 21, which may be relatively narrow for this purpose after which the wall 20 is released and deflects downwardly so that the bottle is securely held in the position shown in Fig. 1.

To accommodate bottles of different lengths, the wall 20 may be longitudinally expansible. For this purpose it may include main section 23, and a secondary section 24, the latter carrying the flange 21, and these two sections overlapping each other as shown. Secured to the section 24 is a screw 25 adapted to ride in a slot 26 formed in the section 23. A knurled head 27 or other suitable fastening may be used to readily clamp the two sections together in set position according to the length of the bottle.

Since the top wall 20 and/or the flange 21 are of substantial width, being preferably as wide as the base 14, there is ample engagement by the holder with the bottle. Thus, if the latter should tend to slide a little sideways, for instance by reason of a relatively shallow recess 19, the bottle would still remain securely engaged. Where the flange 21 snugly seats against the bottom of the bottle, the latter tends to hold section 24 against angular movement about the screw 25 as an axis.

The manner of using the device will now be briefly described. With the baby milk bottle 11 filled up and its nipple attached, ready for feeding the baby, the device 10 is expanded by insertion of the nipple in the neck of the bottle through the opening 16, with the bottle sliding longitudinally along the recess 19, and eventually clearing the flange 21 whereby the device 10 snaps into secure locking engagement with the bottle. The resilience for expansion may be afforded by the entire device 10 or by one or more parts thereof such as the front wall 15 or the top wall 20. It will thus be seen that the device 10 provides a clipping action for supporting the bottle, the holder itself constituting the clip. The device 10 is then positioned on the infant who may proceed to drink the milk without any assistance from its mother or caretaker. It will be perceived that the device 10 may also be used with advantage by grown-up invalids, it being merely necessary to tilt the angle of the holder to suit. Various containers, other than baby milk bottles may be mounted in the holder. Thus the bottle 11 may be regarded as having an opening at its base, in a manner of a tumbler, with the neck 12 omitted or formed to constitute a solid anchoring projection.

The device 10 may be made of any suitable material, such as sheet metal, plastic or composition, cast, molded, or stamped and bent to produce the construction shown. It is light in weight, neat in appearance, easy to clean, and inexpensive to manufacture.

I claim:

1. A portable device for holding a baby milk bottle or the like in inclined drinking position comprising a base, an upwardly extending front wall connected to the base at one end thereof, a top wall connected at one end to said wall to overlie the base and to incline downwardly toward said wall, and an upright rear wall on the other end of the base, said upwardly extending wall having an opening for receiving the neck of the bottle and the said upright wall serving as a support to hold the bottle against the top wall so as to incline downwardly toward the neck, the device comprising resilient portions whereby the top wall is resiliently urged toward the base so that the bottle is clamped in the said inclined position.

2. A portable device according to claim 1 wherein said upright rear wall is provided with a bottle seating recess in its top edge.

3. A portable device according to claim 1 wherein said top wall is provided at its other end with a depending flange for engaging the bottom of the bottle to prevent longitudinal movement thereof.

4. A portable device according to claim 1 wherein said top wall is provided at its other end with a depending portion for engaging the adjacent end surface of the bottle to hold the latter against longitudinal movement, said top wall comprising overlapping sections slidably interengaged so that the length of the top wall can be adjusted to the length of the bottle, and means for locking the top wall in adjusted position.

5. A portable device according to claim 1 wherein said upright rear wall is provided with a bottle seating recess at its top edge and the top wall is provided with a depending flange at its other end adapted to engage the adjacent end surface of the bottle to prevent longitudinal movement thereof, said flange being more remote than the said upright rear wall from said upwardly extending front wall.

ANTHONY MARINO.

REFERENCES CITED

The following references are of record in the file of this patent:

UNITED STATES PATENTS

| Number | Name | Date |
| --- | --- | --- |
| 1,276,936 | McGee | Aug. 27, 1918 |
| 2,092,526 | Aprile | Sept. 7, 1937 |

FOREIGN PATENTS

| Number | Country | Date |
| --- | --- | --- |
| 630,661 | France | Aug. 27, 1927 |